United States Patent [19]

Weber et al.

[11] 3,973,179
[45] Aug. 3, 1976

[54] MODULAR CORDLESS TOOLS

[75] Inventors: Edwin Joseph Weber; Ralph James Secoura, both of Baltimore, Md.

[73] Assignee: The Black and Decker Manufacturing Company, Towson, Md.

[22] Filed: Aug. 23, 1974

[21] Appl. No.: 499,961

[52] U.S. Cl. .................................. 320/2; 200/157; 310/50; 339/58; 339/88 R; 339/91 R
[51] Int. Cl.² ...................... B25F 3/00; H01R 13/54; H01M 10/46;
[58] Field of Search ............. 320/2; 310/50; 339/58, 339/88, 91, 66 M, 152, 121, 184 M, 186 M; 32/DIG. 8; 30/DIG. 1, 216; 15/DIG. 1; 200/157, 61.58

[56] References Cited
UNITED STATES PATENTS

| | | | |
|---|---|---|---|
| 3,533,119 | 10/1970 | Dokos | 320/2 X |
| 3,550,280 | 12/1970 | Palm | 310/50 X |
| 3,796,984 | 3/1974 | Selinko | 339/91 R X |

*Primary Examiner*—J D Miller
*Assistant Examiner*—Robert J. Hickey
*Attorney, Agent, or Firm*—Edward D. Murphy; Leonard Bloom; William Kovensky

[57] ABSTRACT

Cordless electric tools or the like comprising a power handle and a plurality of diverse tool heads detachably securable thereto. The power handle includes battery means therein and operator controlled switch means, whereas each of the diverse tool heads may include an electric motor and an output means. The tool heads and power handle include interengageable means constructed for quick mechanical and electrical interconnection therebetween facilitating quick connection and disconnection of the power handle from the various tool heads without requiring any special tools or implements. Electrical interconnection is made automatically upon mechanical interconnection. In addition, a battery charger for the battery means may include similar mechanical and electrical connection means operatively engageable with the power handle to afford ready and easy charging of the battery means between uses of the power handle.

15 Claims, 13 Drawing Figures

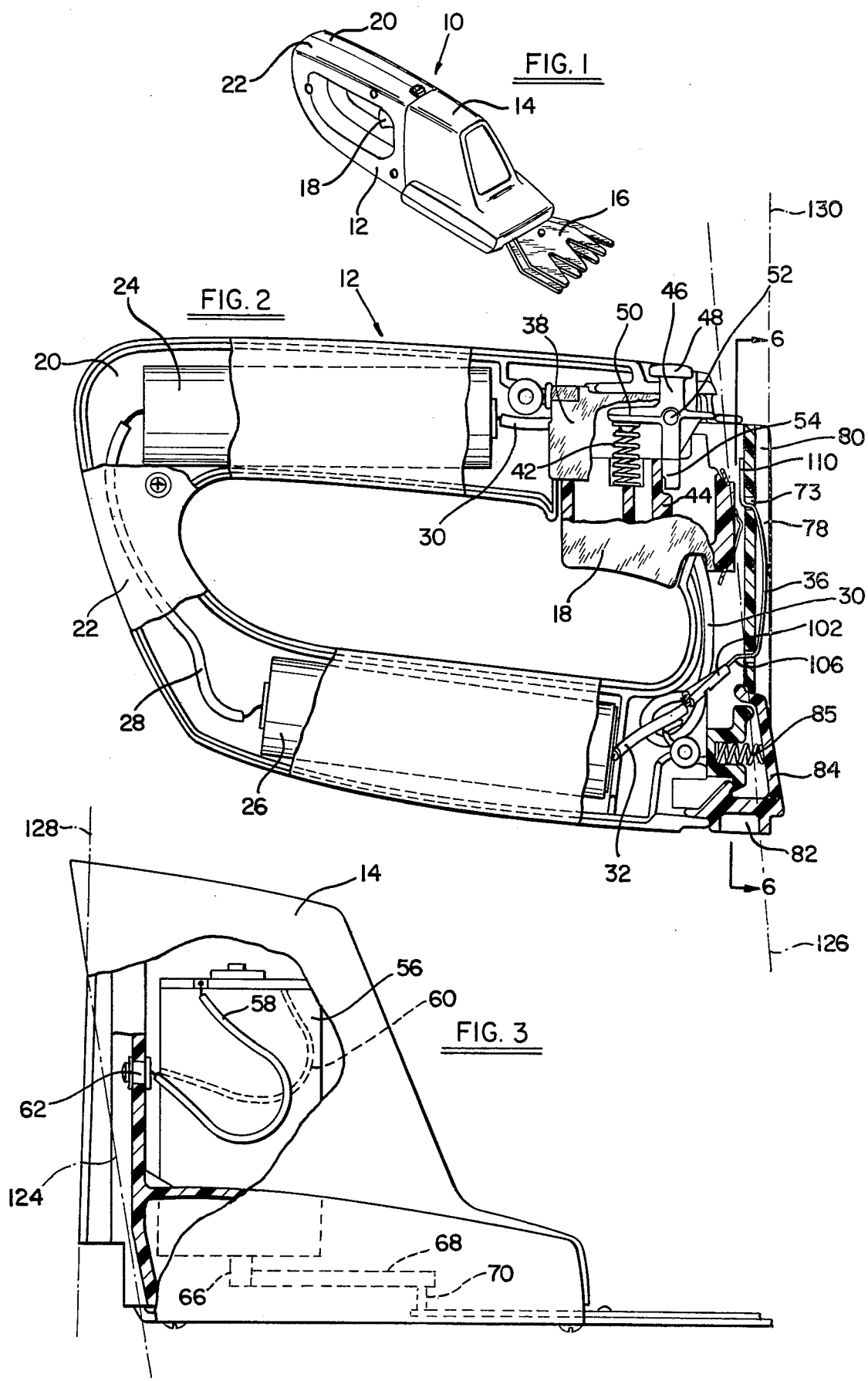

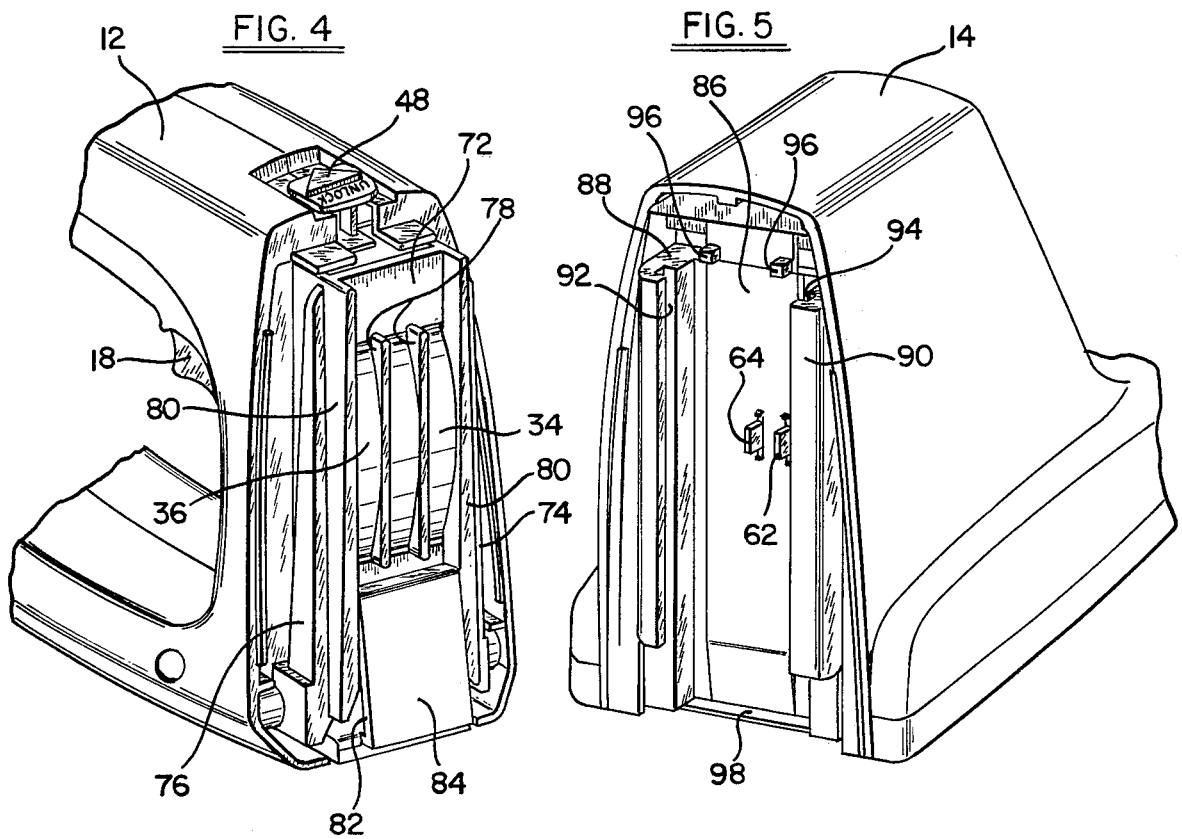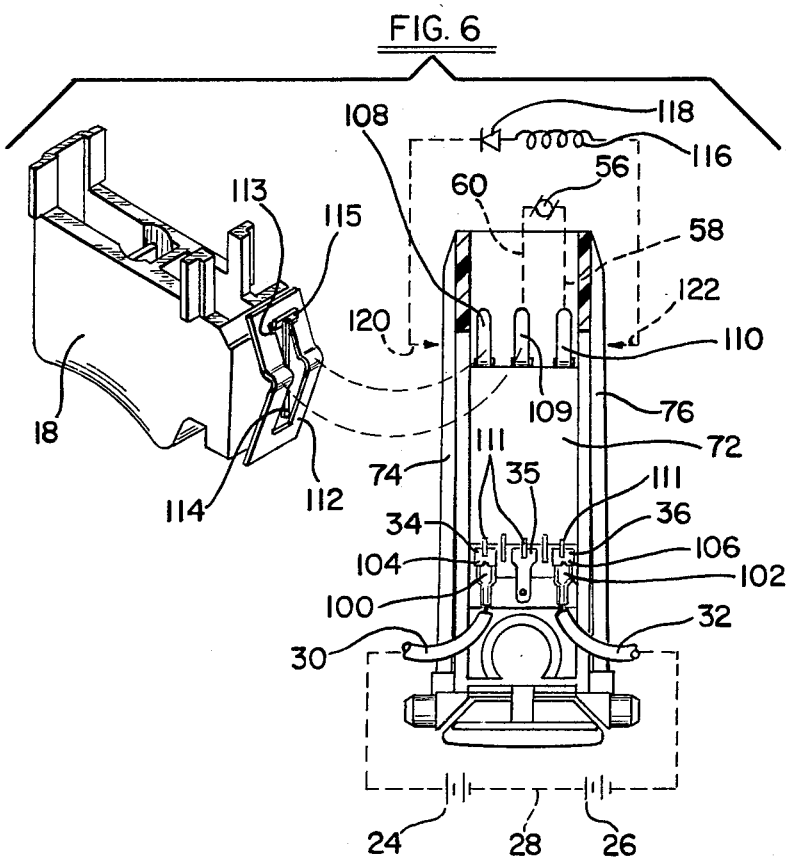

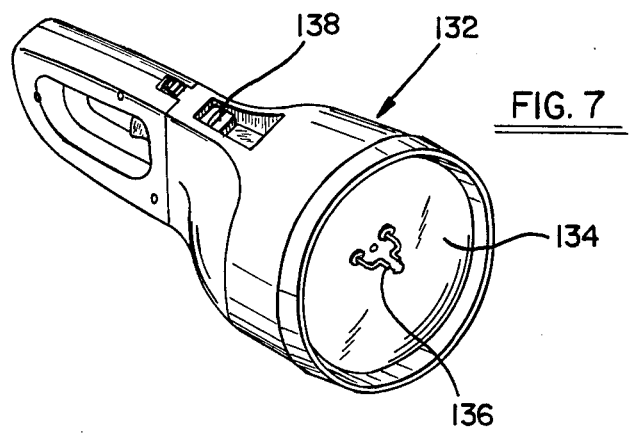
FIG. 7
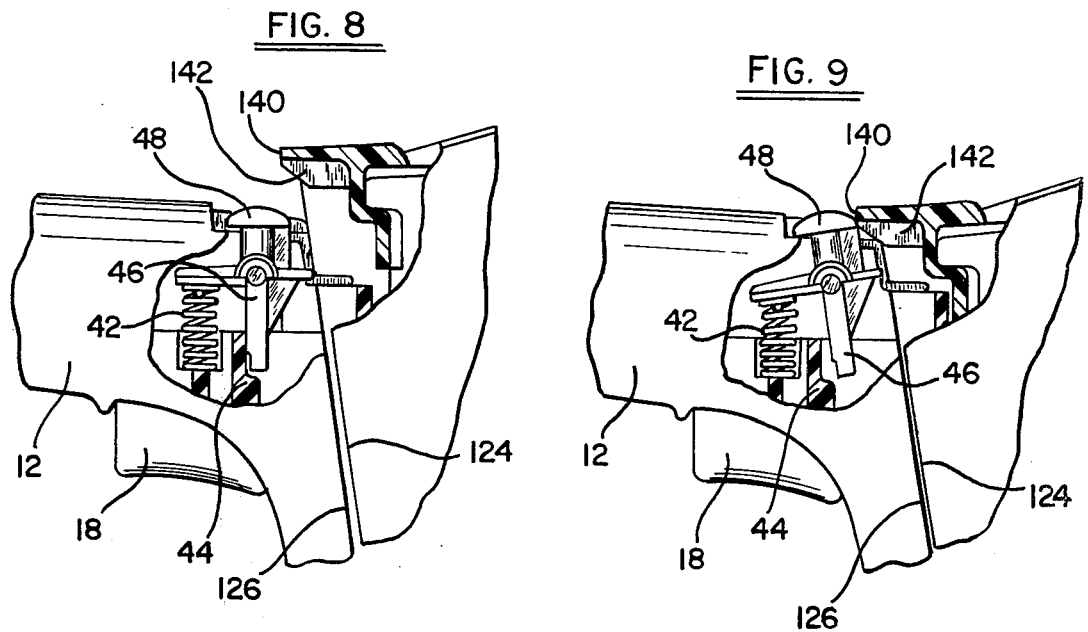
FIG. 8
FIG. 9
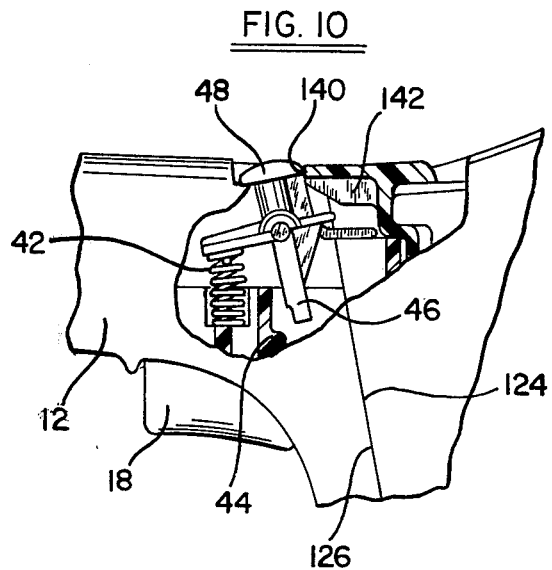
FIG. 10

3,973,179

MODULAR CORDLESS TOOLS

BACKGROUND OF THE INVENTION

Cordless tools including interchangeable battery units are widely known in the prior art, as exemplified for example by U.S. Pat. Nos. 3,043,996; 3,381,636; 3,533,119; 3,186,878; and 3,757,194. However, the general conception of the ultimate product employed in each of these patents has been that of simply substituting a packaged battery-type source of energy as an alternative to the conventional line cord set provided with corded power tools. Thus, the structures described by these patents essentially describe completed, self-contained tools with a receptacle provided therein for receiving the battery.

In the co-pending application of Owings, Beckering, and Bunyea, Ser. No. 500,131,filed concurrently herewith and assigned to the assignee of this application, the specification of which is incorporated herein by reference, a modular system of power tools is described and claimed wherein a specific rechargeable handle module which incorporates rechargeable batteries, a hand grip and a switch may be coupled with a wide variety of interfitting tool heads having various output means. The tool heads generally include a motor, a transmission and an output device such as grass shear blades, drill chuck, etc. The system may also include tool heads which do not utilize a motor such as a flashlight head, a soldering iron, etc. The Owings et al application describes and claims this modular system as a basic concept including a variety of specific novel features which contribute to the practical utilization of the system such as the provision of a large pilot surface to provide for stable interconnection of the modules, the provision of dovetail means to further contribute to the mechanical stability, the provision of exposed electrical contacts which automatically complete appropriate electrical circuits, the provision of a closed loop handle module for strength and ease of manufacture, and the provision of lock-off means to prevent accidental energization of the tool output means during assembly of the respective modules.

The present invention describes and claims the preferred embodiment of the invention set forth in the aforementioned Owings et al application. In particular, the specific mechanical and electrical construction features set forth hereinafter, in the context of the basic modular system, further enhance the practicality, utility and other advantages of the system. Thus, in accord with the present invention, a mechanical-electrical assembly for a modular system of power tools is provided wherein a male-female dovetail interlock tapered in the direction of assembly to enable maximum ease of assembly and maximum structural stability. The system further includes a plurality of exposed electrical contacts disposed between the corresponding dovetail members and arranged so as to provide automatic wiping engagement as the modules are assembled. In further accord with this invention, the terminals of the power handle module extend internally to provide for switching action by means of a simple contacting element mounted directly on the trigger member which is engaged by the operator. Further specific aspects of this invention include the provision of an automatically engaged latch for retaining the separate modules in assembled relation and, on appropriate modules, an automatic override to disengage the lock-off member during assembly.

From the foregoing, it will be apparent that the objects of the present invention include the provision of a simple, low cost interconnection structure for mating, independent modules of a modular power tool system which permits easy assembly while also providing maximum electrical and mechanical integrity of the overall system.

Further objects and advantages of this invention will become apparent as the description and illustration thereof proceed.

THE DRAWINGS

FIG. 1 is a perspective view of an assembled modular tool in accordance with the present invention;

FIG. 2 is a side plan view of the power handle module of FIG. 1, partially broken away and partially in section;

FIG. 3 is a view similar to FIG. 2 but taken of the power head module of FIG. 1;

FIGS. 4 and 5 are respectively front and rear elevations of the power head modules of FIG. 1;

FIG. 6 is a sectional view taken along the lines 6—6 of FIG. 2 and further including the trigger and switch assembly of this invention;

FIG. 7 is a perspective view of an alternative modular tool;

FIGS. 8, 9 and 10 are detailed views showing the assembly of the tool in FIG. 7;

Figure 11:
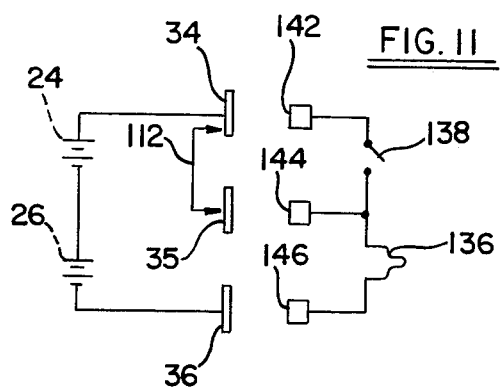
FIG. 11 is a schematic view showing the circuit used in the power tool of FIG. 7.

In the drawings, FIG. 1 illustrates a portable handheld, cordless electric tool 10 which embodies the present invention. The tool includes a power handle 12, shown in detail in FIGS. 2 and 4, detachably secured to a tool head 14, shown in detail in FIGS. 3 and 5. As used herein, the term "tool head" is understood to mean a housing including output means such as a moving blade or shaft, or a static soldering tip or light, and further including a drive train and electric motor combination, if appropriate. In the illustration of FIG. 1, the tool head 14 includes battery-operable means for driving a grass shear blade assembly 16 which is energizable by means of batteries included in the handle 12 under the control of the trigger 18.

As shown in FIGS. 2 and 4, the power handle module 12 preferably includes a pair of clamshell half housings 20 and 22. A plurality of battery cells 24, 26 are provided within the power handle module. These cells are connected in series at one end by conductor 28 and are connected at their other ends by conductors 30 and 32 to a pair of exposed electrical contacts 34 and 36 illustrated in FIG. 4.

As described in the aforementioned co-pending application of Owings et al, the power handle module is preferably a four-sided member with a central aperture which provides a convenient hand grip portion and which contains internally the battery cells, a switching mechanism and a lock-off arrangement to prevent accidental operation of the tool. To accomplish switching and lock off, FIG. 2 illustrates a trigger member 18 which is retained within a switch housing 38 positioned between the clamshell halve 20 and 22. The trigger is spring biased downwardly against retaining surfaces provided in the switch housing by a spring 42. For lock-off purposes, the trigger is provided with an internal shoulder 44 which cooperates with one end of a lock-off lever 46, the lever being provided at its other end with a thumb-engageable button 48. A rearward extension 50 of the lock-off lever engages one end of spring 42 and the lever is fixedly mounted within the module at a pivot point 52.

The function of the spring 42 is to simultaneously bias the trigger to the off position and the lock-off lever to is engaged position. Thus, in the position shown in FIG. 2, if the operator attempts to move the trigger inwardly, the shoulder 44 will engage the end of lock-off lever 46 and further movement of the trigger is prevented. Before the operator can turn the device on, he is required to pivot the lock-off lever 46 by means of button 48 so that the shoulder 44 bypasses the end of the lock-off lever when he engages and moves the trigger 18. Thus, because of this requirement, the likelihood that the trigger can be accidentally engaged is greatly reduced. This is a particular advantage, for example, when the operator is assembling a tool head such as that shown in FIG. 1 to the power handle since otherwise, accidental energization of the grass shear assembly 16 could cause serious injury.

A particular feature of the construction of the present invention is provided by a small tapered shoulder 54 on the lower end of lock-off lever 46. When using a tool such as the grass shear of FIG. 1, it is frequently desirable to relax the trigger so as to turn the device off and yet not release the trigger so far that the lock-off lever 46 engages the trigger. Maintaining the trigger in an intermediate position can be awkward for an operator since this is an undefined position and he must exert a conscious effort to maintain his finger at exactly the right position relative to the handle to avoid either turning the device on or allowing it to be locked off. The tapered shoulder 54 avoids this awkwardness by providing an easily overcome stop or detent position at which level the switch is off but at which the lock-off lever is disengaged. Since the shoulder provides some resistance, the operator can easily hold that position but, when he wishes to turn the tool on, he can easily overcome the small resistance because of the taper provided in the shoulder 54.

To complete an operative tool assembly, a tool head such as that shown in FIGS. 1 and 3 is assembled to the power handle. The tool head module 14 provides an electric motor 56 which is connected by wires 58, 60 to suitable contacts 62, 64 which are arranged to be connected to the battery as will be hereinafter explained. The motor includes an output shaft 66 which drives a transmission means such as gear 68 and eccentric 70 which ultimately produces an output motion such as reciprocation of one of the blades of the grass shear assembly 16.

The detailed mechanical and electrical connection system of this invention will be better understood from a consideration of FIGS. 4 and 5. As shown therein, the power tool module 12 includes at its forward end an interconnection member 72 which includes a pair of ribs 74, 76 which are of increasing width both from side to side and from front to back relative to the handle module. The member 72 also includes a plurality of forwardly extending insulating ribs 78 and 80 which separate and protect the contacts 34 and 36 and an additional, intermediate contact 35. Adjacent the bottom of the forward end of the power handle module, a pivoted latch 82 is provided which is pivotally mounted adjacent the bottom of the ribs 78 and which has a tapered forward surface 84 extending downwardly therefrom. The latch 82 is spring biased outwardly about its pivot point by an internal spring, not shown.

The rear portion of the tool head module 14 includes a complementary mounting member 86. Extending along the sides of the mounting member 86 are a pair of ribs 88, 90 having internal tracks 92, 94 which are tapered complementarily to the ribs 74, 76 on the power handle module. Thus, to mechanically assemble the modules, the ribs 74, 76 are engaged respectively in the tracks 92, 94 and the modules are pushed together until the tracks and ribs are fully engaged which occurs when the upper surface of member 72 encounters the stops 96 on mounting member 86. To maintain these members in engagement, a small ledge 98 is provided at the bottom of member 86. The ledge moves the latch member 82 out of the way by virtue of the tapered surface 84 and engages under the bottom edge of the latch to retain the modules in assembled condition until the operator disengages the latch.

During the mechanical assembly of the modules as just described, the electrical contacts 62 and 64 engage and slide along the spring contacts 35 and 36 on the power handle module. Thus, this construction achieves not only electrical contact but also a wiping action to help overcome any buildup of corrosion on the contacts which might prevent proper electrical continuity.

FIG. 6 illustrates the electrical arrangement and switch mechanism of the present invention. As previously noted, the batteries are directly connected by wires 30 and 32 to spring contact 34 and 36. As can be seen in FIG. 6, this connection is accomplished by means of push-on terminals 100, 102 which engage respectively flag portions 104, 106 of the terminals 34, 36. As also can be seen in FIGS. 2 and 6, the upper ends of terminals 34, 35 and 36 are extended inwardly of the mounting member 72 through slots 73 formed therein and are provided with flat upper portions 108, 109 and 110 which lie against the internal surface of mounting member 72. The contacts are retained in place by small spring tab 111. Thus, the battery cells 24, 26 are permanently connected to contacts 34 and 36 and therefore to internal contact portions 108, 110. As illustrated schematically in FIG. 6, the motor 56 is connected by wires 58, 60 and contacts 62, 64 to contacts 35 and 36.

To provide for energization of the motor 56, a switch means is provided to connect the upper portion 108 of contact 34 to the upper portion 109 of contact 35. This is accomplished by means of a metal spring contact member 112 which is mounted on a suitable rib 114 on the front end of trigger 18 as shown in FIG. 6. In the rest position of the trigger shown in FIG. 2, spring 42 biases the trigger downwardly so that the contact member 112 rests against the insulating inner surface of mounting member 72. When the unlocked member is disengaged and the trigger is moved to the upper position against the force of spring 42, the contact member 112 is moved into engagement with contact portions 108 and 109, thus completing electrical connection thereof. Thus, the motor 56 is energized by virtue of its connection through wires 58 and 60 to contacts 62, 64 which are engaged with contacts 35 and 36. Contact 35 is switched into connection with contact 34 and the batteries are serially connected permanently between the contacts 34 and 36 to complete the circuit.

FIG. 6 also illustrates the interconnection of the charger in the present system. As set forth in the application of Owings et al, a charger circuit is provided in a housing which includes suitable interconnection means, substantially identical to those provided on the tool head 14, so that the charger housing connects to the power handle module in the same manner. A transformer and diode or other suitable charger configuration is provided within the charger housing. FIG. 6 illustrates schematically the secondary winding 116 of such a transformer and a diode 118. The charger housing would include contacts illustrated schematically by arrows 120, 122. As indicated by FIG. 6, these would be positioned to engage contacts 34 and 36 of the power handle module. Since the battery is permanently connected to contacts 34 and 36, the charger circuit is completed as soon as the modules are assembled and there is no need for the operator to engage the trigger in order to complete a charging circuit.

A particular advantage of the present invention lies in the provision of a switch which simply requires the addition of the spring metal contact 112 to the trigger and the contact elements which would be required regardless of what type switching mechanism might be provided. This simplified construction completely eliminates several additional parts and interconnection steps which would normally be required, thus reducing the size, weight and cost of the unit and eliminating parts which might lead to failure, for example, due to lead breakage, etc.

To mount the spring contact 112 on the switch rib 114, the spring contact is provided with a T-shaped slot 113 and the rib 114 is provided with a corresponding cross head 115. Cooperation between the T-slot and cross head extending transversely to the direction to the movement of the trigger positively locates the spring contacts relative to the trigger and eliminates relative motion which might otherwise be present and which might cause difficulty in closing the circuit.

Another aspect of this invention lies in the provision of an angular relationship between the mechanical mounting means by which the respective modules are engaged and the mating edges of the external housings of the modules. More particularly, if these respective engaging surfaces were arranged in parallel, interference between the matching housing surfaces could occur as soon as the two modules and their mounting members are positioned for assembly. Depending on the tolerance arrangement of the respective parts, which frequently presents a difficulty in low cost plastic housings, binding could occur or alternatively an unsightly gap might be left which could admit dirt or moisture to the electrical contact area.

The difficulties caused by this parallelism can be reduced by providing the angle illustrated, for example in FIGS. 2 and 3, between the leading edge of the respective housings, illustrated by the dotted lines 124 and 126, and the plane of the mounting parts, illustrated by the dotted lines 128 and 130. Because of this angle, which may be on the order of 4° to 7° although this is not critical, initial engagement of the mounting parts occurs while the housing edges are still relatively widely spaced. As the mounting members are moved into their assembled relationship, the gap between the juxtaposed housings becomes less and less until, in the completely assembled position, the housings meet to complete the enclosure of the tool. This aspect of the present construction is illustrated also in FIGS. 8-10 wherein the gap between the leading edges of the housings 124, 126 decreases as the respective modules are moved toward the assembled position.

FIGS. 8-10 also illustrate a further aspect of this invention which is of use with regard to certain selected tool head modules in which no safety hazard is caused if the trigger switch should be turned on accidentally. For example, FIG. 7 illustrates a flashlight including the power handle module 12 coupled with a flashlight head 132. The flashlight head includes a suitable lamp having a lens 134 and filament 136 adapted to be operated from the batteries in the power handle. Since no safety hazard can be occasioned by accidental operation of the trigger switch, the rear portion of the housing of the flashlight head includes means for automatically disengaging the lock-off button of the power handle module 12. Specifically, as shown in FIGS. 8-10, a rearward extension 140 of the housing is positioned to engage the lock-off button 48. The underside of the extension 140 includes a tapered camming surface 142. As the respective modules 12 and 130 are moved into their assembled position, the tapered camming surface 142 engages the forward edge of the lock-off button 48 and cams it rearwardly to disengage the end of the lock off lever 46 from the shoulder 44 of trigger 18. Thereafter, the operator can activate the flashlight by simply moving the trigger without the necessity of having to first release the unlocked lever 46.

With regard to the flashlight illustrated in FIG. 7, a particular aspect of this construction which is permitted by the specific electrical arrangement described previously lies in the fact that, while the power handle has a very simple switch which is actuated on as long as the operator physically holds it in the on position, to avoid excessive battery drain as might occur if a high drain power head module were left switched on when not actually in use, the multiple contact arrangement permits devices such as the flashlight to have a continuous duty switch such as that shown at 138. Thus as illustrated schematically in FIG. 11, the flashlight module 132 includes three terminals 144, 146, 148 which respectively engage with the contacts 34, 35, 36 on the power handle. Accordingly, when the flashlight module is assembled to the power handle, closure of switch 112 by means of trigger 18 causes momentary operation of the flashlight until the trigger is released. If continuous operation is required, suitable connections to contact 137 and the filament from switch 136 permit the switch to be moved to the on position where it remains without the operator being required to continuously hold the trigger. On the other hand, as previously noted, high drain devices such as those having motors cannot be "locked-on" since the power handle module is not provided with this feature.

Figure 12:
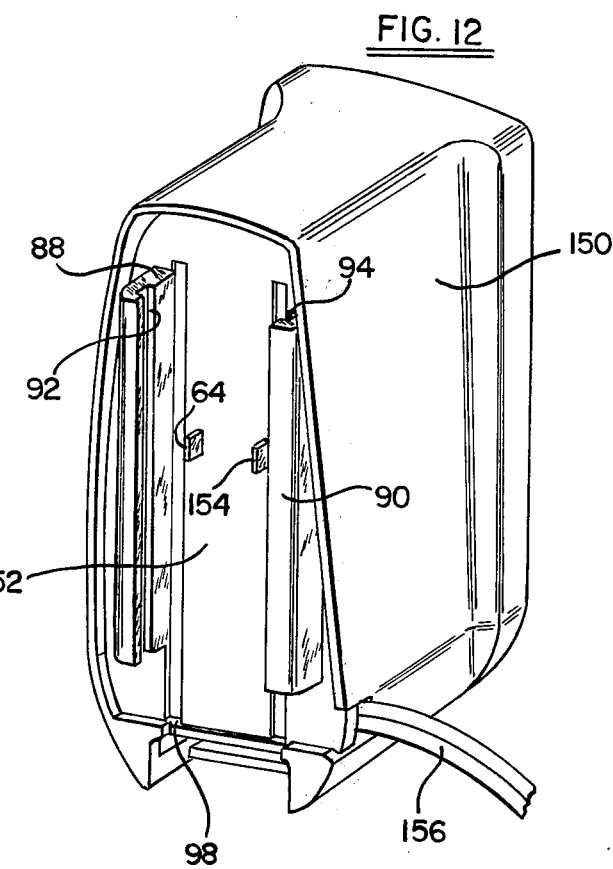
FIG. 12 is a perspective view of a charger module for use in the present invention.

As previously noted, the power handle module 12 is adapted to be recharged by interconnection with a charger module which includes a mounting arrangement similar to that of the utility-type tool heads. Thus, as shown in FIG. 12, a power head module 150 is provided with a rear mounting structure similar to that shown in FIG. 5. In this case, of course, terminals 152 and 154 are provided to engage contacts 34 and 36 so that the switch is bypassed and charging occurs even though the switch is off. A cord set 156 is provided for connection to a suitable source of power. Internally, any of a wide variety of charging circuits may be provided such as the conventional transformer-diode combination.

As set forth in the aforementioned Owings et al application, a particularly useful application of the present invention is to the cordless grass shear since the modules may be assembled directly as indicated in FIG. 1 to form a hand-held unit of appproximately conventional style or, when desired, an intermediate extension module may be positioned between the units to provide a stand-up, wheeled unit. This arrangement is illustrated in FIG. 13 wherein the power handle module 12 and tool head module 14, indicated schematically are separated by the extension handle module 160.

Figure 13:
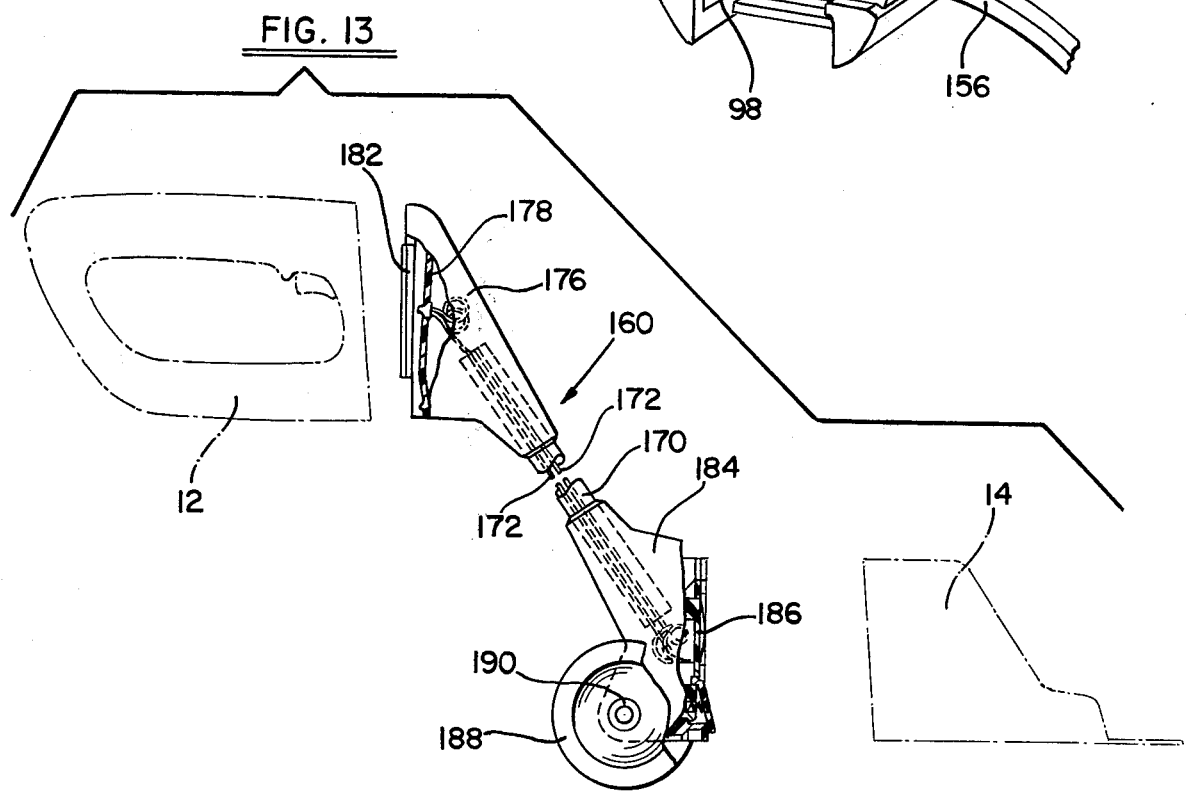
FIG. 13 is a side elevational view, partially in section, showing an extension module.

As shown in FIG. 13, the extension handle housing includes an elongated tube 170 of suitable height which encloses a pair of conductors 172, 174. A housing 176 at the upper end of the extension tube encloses a mounting member 178 which corresponds to the member 86 shown in FIG. 5. A pair of contacts, one of which is shown at 180, extends through the mounting member 178 to make appropriate electrical contact with the contacts on the face of the power handle module 12. Similarly, a pair of ribs, one of which is shown at 182, are provided to mechanically engage with the corresponding ribs on the power handle module.

At the lower end of the extension tube, a second housing 184 is provided which includes a mounting member 186 which corresponds to that shown at 72 in FIG. 4. The contacts and mechanical structure associated with the member 186 correspond to those associated with the members 72. A pair of wheels 188 are also provided and mounted to the housing 184 by an axle 190. Accordingly, the extension handle module is adapted to receive the power handle module at one end and the tool head module at the other so that a standup grass shear can readily be assembled when desired.

In the foregoing specification, a particular embodiment of this invention has been illustrated and described and various specific features of this construction have been pointed out. It will be clear to those skilled in the art that further changes and modifications may be readily made therein. Accordingly, it is intended that the appended claims cover all such changes and modifications as may fall within the scope of the appended claims.

We claim:

1. In a modular cordless power tool assembly including a power handle module and a tool head module first complementary means for electrically coupling said modules and second complementary means on each of said modules for mechanically coupling said modules to form a power tool, said first and second complementary means being disposed within facing end surfaces of said modules, the improvement wherein said second complementary means on one of said modules includes a pair of laterally spaced, outwardly facing ribs of gradually increasing width and of gradually increasing depth and wherein the other of said modules includes a pair of slots complementary to said ribs in both width and depth to provide initial engagement of enlarged portions of said slots with reduced portions of said ribs and final engagement of corresponding portions of said ribs and said slots whereby assembly of said modules into a structurally rigid tool is facilitated.

2. In a modular cordless power tool assembly including a power handle module and a tool head module, each of said modules including facing surfaces, and complementary means on each of said modules for mechanical and electrical coupling thereof to form a power tool, said complementary means being disposed within said facing surfaces of said modules, the improvement wherein said power handle module includes a plurality of batteries and a switch, a pair of electrical contacts said batteries being connected between said pair of electrical contacts exposed within said facing end surface of said power handle module, a third electrical contact exposed within said power handle module end surface and said switch being arranged to connect one of said pair of contacts to said third contact.

3. A modular assembly as claimed in claim 2 wherein each of said contacts comprises an elongated strip of metal having one end disposed within said power handle module, and wherein said switch comprises a finger-engageable trigger and a conductive element mounted on said trigger, said conductive member being adapted to bridge two of said ends of said contacts upon movement of said trigger into its "on" position.

4. A modular assembly as claimed in claim 3 wherein said trigger comprises a plastic body having a T-shaped rib on one end thereof and wherein said conductive element is provided with T-shaped slot for engagement with said T-shaped rib.

5. A modular assembly as claimed in claim 4 wherein said element is bent to provide a spring force to maintain said element in secure contact with said contact ends when said trigger is in its "on" position.

6. A power handle module for use in a modular cordless power tool assembly, said handle comprising a pair of clam shell type housing halves joined to form a power handle housing, a plurality of battery cells disposed within said clam shell housing, a mounting member retained between said housing halves and forming a closure for one end of said handle housing, a first pair of electrical contacts exposed within an external surface of said mounting member, said battery cells being connected in series between said first pair of electrical contacts, a third electrical contact exposed within said external surface of said mounting member, a switch housing integral with and extending rearwardly from said mounting member, a trigger disposed within said switch housing and extending externally of said power handle housing for engagement thereof by an operator, a contact element mounted on one end of said trigger body within said handle housing, said contact element bridging and electrically connecting said third electrical contact with one of said pair of electrical contacts when said trigger is moved inwardly into said housing.

7. A power handle module as claimed in claim 6 wherein said mounting member includes a pair of laterally spaced, outwardly facing ribs having a gradually increasing lateral span along the length of said mounting member.

8. A power handle module as claimed in claim 7 wherein the thickness of said ribs increases gradually in the same direction across the length of said mounting member.

9. In a modular cordless power tool assembly including a power handle module and a tool head module each of said modules including facing end surfaces, said end surfaces being substantially parallel to one another when said modules are assembled and complementary means on each of said modules for mechanical and electrical coupling thereof to form a power tool, said complementary means being disposed within said facing end surfaces of said modules, the improvement wherein said complementary coupling means on each of said modules are aligned to provide for assembly of said modules in a first direction, said first direction being parallel to said facing end surfaces wherein each of said modules includes an external housing portion for enclosing said complementary coupling means, and wherein the end of each of said external covering housing portions is disposed at an acute angle relative to said assembly direction, so that assembly of said modules in the direction of said parallel end surfaces provides an elongated, stable region of engagement therebetween due to engagement of said parallel end surfaces, said angled disposition of said ends of said housing portions providing a space therebetween during assembly movement of said modules in said first direction to prevent interference thereof and providing a complete enclosure for said coupling means in the assembled position of said modules.

10. A modular power tool assembly as claimed in claim 2 and further comprising lock-off means for preventing inadvertent movement of said switch, said lock-off means comprising a lever extending into and blocking the normal path of movement of said switch, said lever being pivotable out of the path of said switch; said switch being movable along said path from a first, "off" position to a second, intermediate position wherein said lever is prevented from moving into the path of said switch and further movable into a third "on" position; said lock-off lever including a tapered stop along a side surface thereof to define the location of said intermediate position.

11. A modular cordless power tool assembly as claimed in claim 6 wherein a pivoted latch member is mounted on said mounting member adjacent to the widest portion of said ribs for retaining a power head module thereto.

12. A tool head module for use in a modular cordless power tool assembly, said tool head module comprising a housing having one open end; a mounting member disposed within and closing said open end of said housing, said housing supporting electrically energizable output means; said mounting member comprising longitudinally extending laterally tapered means for receiving complementary mounting means on a power handle module; and a plurality of exposed electrical contacts mounted on said mounting member for engagement with complementary contacts on a power handle module upon assembly thereof to form a complete power tool; said longitudinally extending tapered means being aligned in a first direction and said open end of said housing being disposed at an acute angle to said first direction, whereby upon assembly of said module in a power tool assembly in the direction of said longitudinally extending means, said angled open end of said housing moves in a parallel path at the same acute angle to said first direction.

13. A tool head module for use in a modular cordless power tool assembly, said tool head module comprising a housing having one open end; a mounting member disposed within and closing said open end of said housing, said housing supporting electrically energizable output means; said mounting member comprising longitudinally extending laterally tapered means for receiving complementary mounting means on a power handle module; and a plurality of exposed electrical contacts mounted on said mounting member for engagement with complementary contacts on a power handle module upon assembly thereof to form a complete power tool; two of said electrical contact means being connected serially with said output means for energization thereof upon application of power to said two electrical contacts; a switch disposed within said tool head module, a third electrical contact connected to a first one of said two electrical contacts via said switch, said switch being actuatable to provide for energization of said output means upon the application of electrical power to said third electrical contact and the second of said two electrical contacts.

14. In a modular cordless power tool assembly including a power handle module and a tool head module, said modules including facing end surfaces and complementary means on each of said modules for mechanical and electrical coupling thereof to form a power tool, said complementary means being disposed within facing end surfaces of said modules, and said power handle module further including a switch, the improvement comprising a lock-off member for normally preventing operation of said switch on said power handle module, said lock-off member being located at one end of said facing end surface of said power handle module; and a tapered rib extending from said tool head module for automatically disengaging said lock-off member upon assembly of said tool head module and said power handle module.

15. A tool head module for use in a modular cordless power tool assembly, said tool head module comprising a housing having one open end; a mounting member disposed within and closing said open end of said housing, said housing supporting electrically energizable output means; said mounting member comprising longitudinally extending laterally tapered means for receiving complementary mounting means on a power handle module; and a plurality of exposed electrical contacts mounted on said mounting member for engagement with complementary contacts on a power handle module upon assembly thereof to form a complete power tool; said housing further including a tapered rib portion extending beyond said mounting member for exerting a camming force against a portion of a power handle module moved into engagement with said tool head module.

* * * * *